(12) United States Patent
Kabani et al.

(10) Patent No.: US 7,003,423 B1
(45) Date of Patent: Feb. 21, 2006

(54) PROGRAMMABLE LOGIC RESOURCE WITH DATA TRANSFER SYNCHRONIZATION

(75) Inventors: Malik Kabani, Sunnyvale, CA (US); Henry Lui, San Jose, CA (US)

(73) Assignee: Altera Corporation, San Jose, CA (US)

( * ) Notice: Subject to any disclaimer, the term of this patent is extended or adjusted under 35 U.S.C. 154(b) by 34 days.

(21) Appl. No.: 10/741,593

(22) Filed: Dec. 18, 2003

(51) Int. Cl.
*G01R 27/28* (2006.01)
*G01M 19/00* (2006.01)
*G06F 1/04* (2006.01)

(52) U.S. Cl. ............ 702/120; 702/125; 713/501; 713/502

(58) Field of Classification Search ......... 702/57, 702/121, 122, 124, 125; 713/500, 501, 502; 714/23; 327/116, 141, 147, 154
See application file for complete search history.

(56) References Cited

U.S. PATENT DOCUMENTS

| 6,650,140 | B1 | 11/2003 | Lee et al. ............... 326/39 |
| 2001/0033188 | A1 | 10/2001 | Aung et al. ............. 327/141 |
| 2004/0236977 | A1* | 11/2004 | Kizer et al. ............ 713/500 |

OTHER PUBLICATIONS

U.S. Appl. No. 10/059,014, filed Jan. 29, 2002, Lee et al.
U.S. Appl. No. 10/713,877, filed Nov. 13, 2003, Churchill et al.
Altera Corporation, "Using Source-Synchronous Signaling with DPA in Stratix GX Devices," Application Note 236, Version 1.0, Nov. 2002, pp. 1-18.

* cited by examiner

*Primary Examiner*—Bryan Bui
*Assistant Examiner*—Meagan S Walling
(74) *Attorney, Agent, or Firm*—Fish & Neave IP Group Ropes & Gray LLP; Evelyn C. Mak

(57) ABSTRACT

A more time-efficient and area-efficient approach is provided to synchronize the transfer of data into programmable logic resources. A programmable logic resource core clock and a reset signal are routed to a reset register that controls the reset of a dynamic phase alignment circuit and a data realigner. The dynamic phase alignment circuit includes a phase-locked loop circuit, a J counter, and a deserializer. When the output signal of the reset register transitions from logic 1 to logic 0, the J counter begins to count and sets an enable signal accordingly. The enable signal, which controls the output of synchronized parallel data from the deserializer, is therefore phase associated with the programmable logic resource core clock. The synchronized parallel data is input to a data realigner which outputs the data based on the programmable logic resource core clock for input to the programmable logic resource core circuitry.

23 Claims, 8 Drawing Sheets

PROGRAMMABLE LOGIC RESOURCE WITH DATA TRANSFER SYNCHRONIZATION

BACKGROUND OF THE INVENTION

This invention relates to programmable logic resources. More particularly, this invention relates to synchronizing the transfer of data into programmable logic resources.

A programmable logic resource is a general-purpose integrated circuit that is programmable to perform any of a wide range of logic tasks. Known examples of programmable logic resource technology include programmable logic devices (PLDs), complex programmable logic devices (CPLDs), erasable programmable logic devices (EPLDs), electrically erasable programmable logic devices (EEPLDs), and field programmable gate arrays (FPGAs).

Input-output (I/O) circuitry is provided to facilitate the transfer of data into programmable logic resources. The I/O circuitry serves as an interface between programmable logic resource core circuitry and circuitry external to the programmable logic resource.

Data is often transferred from external circuitry to programmable logic resource core circuitry over multiple channels. The I/O circuitry can include a dynamic phase alignment circuit, a phase synchronizer, and a data realigner associated with each channel, and one phase-locked loop (PLL) circuit. The PLL circuit receives as input a forwarded clock and generates multiple clock phases based on the forwarded clock. The multiple clock phases and data signals are sent to the dynamic phase alignment circuit associated with each channel. The dynamic phase alignment circuit operates to minimize skew in the data signal relative to the clock to allow for data to be correctly transferred into the programmable logic resource core circuitry. Each dynamic phase alignment circuit generates a recovered clock based on the multiple clock phases generated by the PLL circuit, aligns the data signal to the recovered clock to produce retimed data, converts the retimed data to parallel data having a suitable number of bits (e.g., 8 bits, 10 bits), and outputs the parallel data at the same frequency as the programmable logic resource core clock but with a different phase. The parallel data is then sent to the phase synchronizer which includes a 4-bit deep first-in first-out (FIFO) buffer. The phase synchronizer synchronizes the phase of the parallel data to the phase of the programmable logic resource core clock for output to a data realigner. The data realigner, which can change the boundary of the synchronized parallel data, outputs data for transmission through the corresponding channel to the programmable logic resource core circuitry.

There are several limitations with using phase synchronizers to synchronize the transfer of data into programmable logic resources. Implementing a phase synchronizer results in clock latency. For a 4-bit deep FIFO buffer, up to four cycles of latency can be introduced in the data path. In addition, the phase synchronizer requires a large amount of logic to implement, which increases the area and thus cost of the programmable logic resource.

In view of the foregoing, it would be desirable to provide a more time-efficient and area-efficient approach in synchronizing the transfer of data into programmable logic resources without the use of phase synchronizers.

SUMMARY OF THE INVENTION

In accordance with the invention, a more time-efficient and area-efficient approach in synchronizing the transfer of data into programmable logic resources without the use of phase synchronizers is provided.

Data transfer blocks are provided in each channel in a programmable logic resource to synchronize the transfer of data from external circuitry to programmable logic resource core circuitry. Each data transfer block includes a dynamic phase alignment circuit, a reset register, and a data realigner. Each dynamic phase alignment circuit receives as input a data signal and multiple clock phases based on a forwarded clock generated by a phase-locked loop (PLL) circuit. The dynamic phase alignment circuit generates a recovered clock based on the multiple clock phases and aligns the data signal to the recovered clock using a digital PLL circuit, and then outputs parallel synchronized data using a deserializer and J counter.

A programmable logic resource core clock and reset signal are sent to a reset register for each channel. The programmable logic resource core clock is generated from the same clock source used to generate the multiple clock phases and thus has a predetermined frequency relationship with the multiple clock phases. Each reset register controls the reset of the J counter for the deserializer. When the reset signal of the J counter transitions from logic 1 to logic 0, the counter begins to count at a next clock cycle and sets an enable signal accordingly. The enable signal controls the output of the synchronized parallel data from the deserializer. Because the programmable logic resource core clock is used to release the reset signal of the J counter in each channel, the enable signal generated by the J counter and the programmable logic resource core clock are phase associated.

The synchronized parallel data is sent as input to the data realigner. The data realigner can change the boundary of the synchronized parallel data and then outputs the data based on the programmable logic resource core clock for input to the programmable logic resource core circuitry.

Implementing a reset register to synchronize the transfer of data in accordance with the invention has several advantages over using a phase synchronizer. The reset register eliminates the latency associated with storing data in the FIFO buffer of the phase synchronizer. The invention therefore makes it easier for a user to design logic in, and can potentially save logic elements used in, the programmable logic resource core circuitry. In addition, less logic is needed to implement the reset register, which decreases the area and thus cost of the programmable logic resource.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
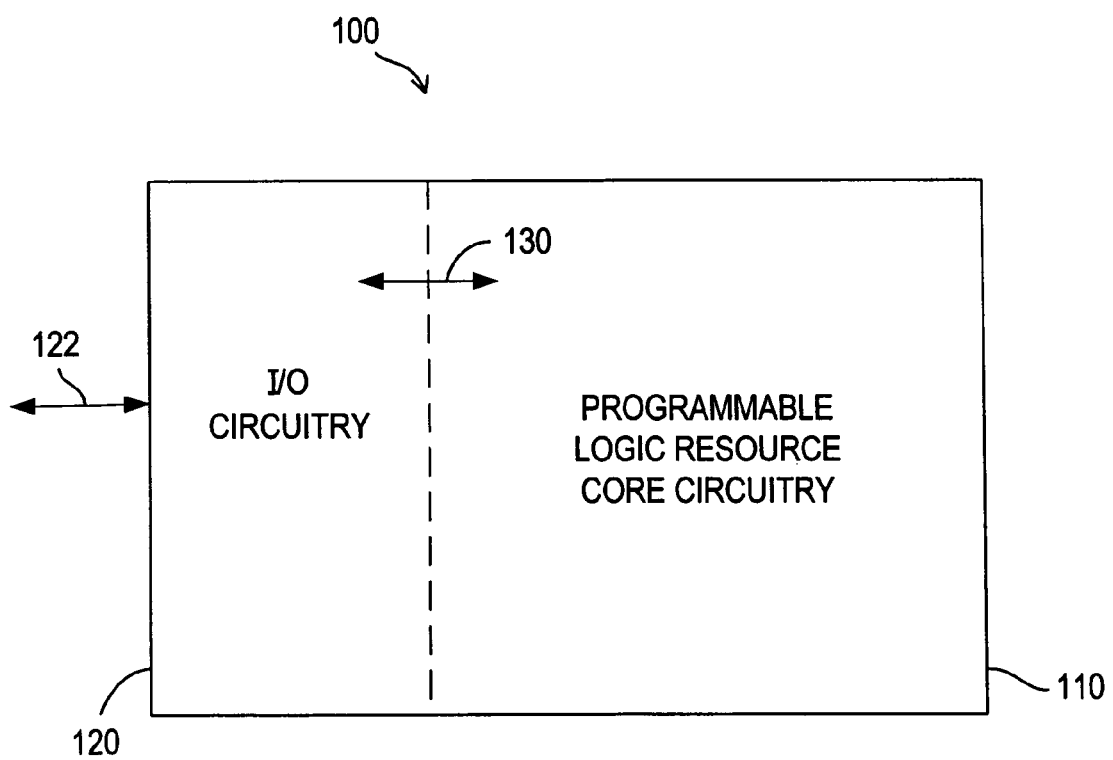
FIG. 1 is a simplified block diagram of an illustrative embodiment of a programmable logic resource in accordance with the invention.

An illustrative programmable logic resource 100 constructed in accordance with the invention is shown in FIG. 1. Programmable logic resource 100 is an integrated circuit that includes programmable logic resource core circuitry 110 and input-output (I/O) circuitry 120. Programmable logic resource core circuitry 110 can be typical programmable logic circuitry of any of several known types and constructions. I/O circuitry 120 can be any suitable interface that allows the transfer of data between programmable logic resource core circuitry 110 and circuitry external to programmable logic resource 100. I/O circuitry can be, for example, high speed serial interface circuitry implemented in an intellectual property block.

Although the invention is described herein primarily in the context of providing circuitry for synchronizing the transfer of data on a programmable logic resource for clarity, the circuitry can be provided on any suitable device such as, for example, an application-specific standard product (ASSP), an application-specific integrated circuit (ASIC), a full-custom chip, or a dedicated chip.

I/O circuitry 120 is used to receive one or more signals via connection(s) 122 and to pass the information thus received on to programmable logic resource core circuitry 110 in a form that is more readily usable by the core circuitry. Alternatively or additionally, I/O circuitry 120 may be used to output via connection(s) 122 one or more signals indicative of information received from programmable logic resource core circuitry 110. Leads 130 are used to convey signals between programmable logic resource core circuitry 110 and I/O circuitry 120.

Figure 2:
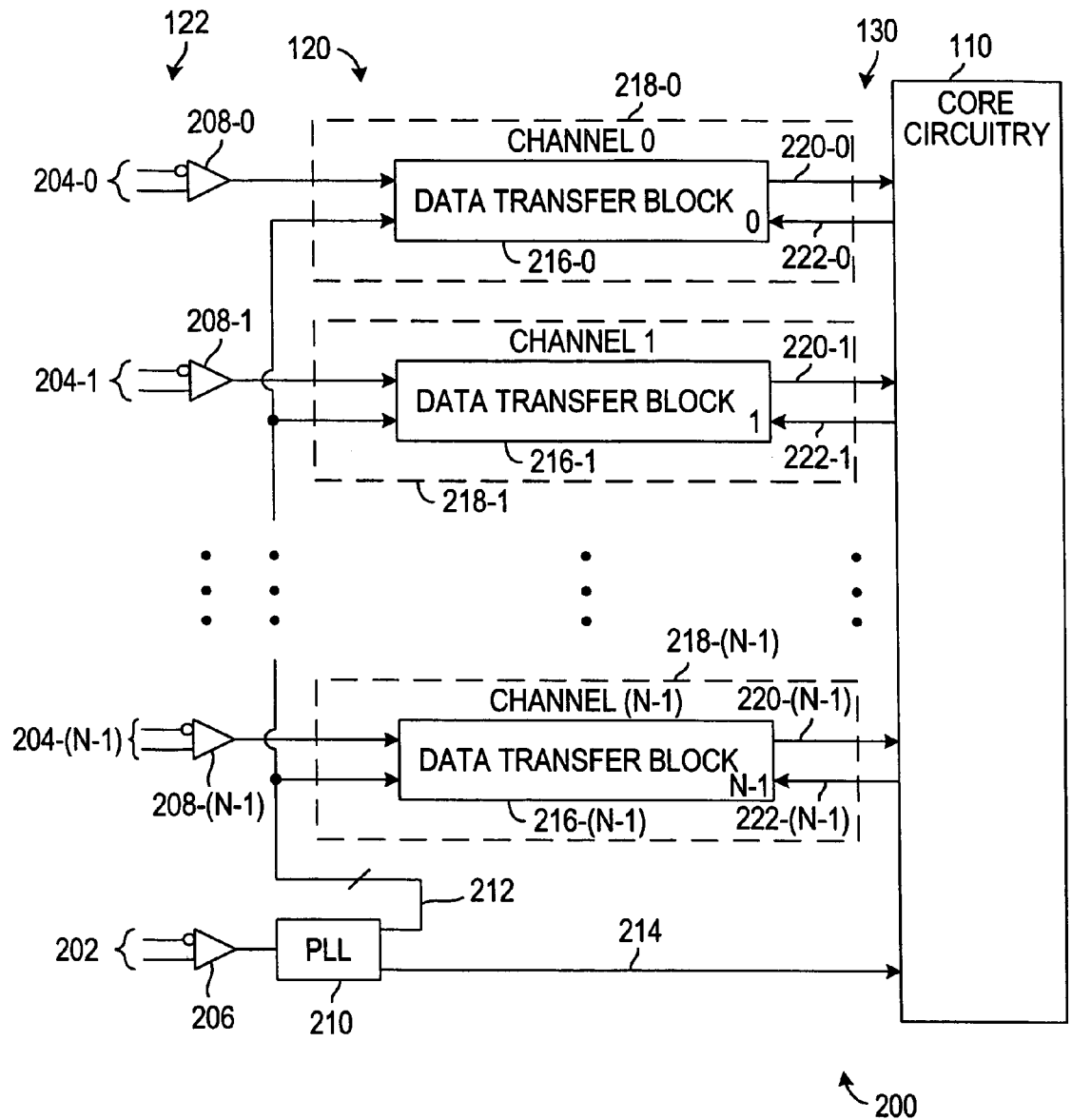
FIG. 2 is a more detailed, but still simplified block diagram of a representative portion of the programmable logic resource shown in FIG. 1 in accordance with the invention.

FIG. 2 illustrates a more detailed but still simplified block diagram of a programmable logic resource 200. Programmable logic resource 200 receives differential signal pairs 202 and 204 via input pins from circuitry external to programmable logic resource 200 or from another suitable source. Signal pairs 202 and 204 can be routed via a backplane, cables, over a printed circuit board, or another suitable path. Signal pair 202 can be a forwarded clock. Signal pairs 204 can be input data signals. Signal pairs 202 and 204 are applied to conventional differential signaling drivers 206 and 208, respectively, to convert the signals back to a single-ended signal. Although the input signals are described herein primarily in the context of differential signal pairs 202 and 204 for clarity, circuitry 200 can receive as input single-ended signals from any suitable source. Although FIG. 2 is described herein primarily in the context of data being received from external circuitry for transfer to programmable logic resource core circuitry 110, data can also be transmitted from programmable logic resource core circuitry 110 to external circuitry.

The output of driver 206 is input to a phase-locked loop (PLL) circuit 210 that generates multiple clocks 212 having a multiple of the frequency of the forwarded clock with different phases that are equally-spaced apart. The number of clocks 212 generated can be any suitable number (e.g., 8). The more clocks 212 that are generated, the smaller the phase difference between clocks and thus the better the resolution. The clocks can sample at a double data rate (DDR) (i.e., at a rising edge and a falling edge) or at a single data rate (i.e., at a rising edge or at a falling edge). PLL circuit 210 can also generate another clock 214 based on one of clocks 212. PLL circuit 210 can include circuitry that divides one of clocks 212 by a predetermined factor to generate clock 214. Clock 214 can be sent to programmable logic resource core circuitry 110 to be used as the programmable logic resource core clock. Within programmable logic resource core circuitry 110, clock 214 can be sent as input to a multiplexer along with one or more clocks, from external circuitry or from other suitable sources, that are generated from the same clock source as signal pair 202. The multiplexer can be controlled by a signal that selects which input to send to the output as the programmable logic resource core clock. PLL circuit 210 can be a digital PLL, an enhanced PLL, or another suitable type of PLL.

The output of each driver 208, clocks 212, and signals 222 from programmable logic resource core circuitry 110 are input to a data transfer block 216 in each channel 218. Signals 222 can include, for example, a common reset signal, a common programmable logic resource core clock, and control signals. Signals 222 can be the same for each data transfer block 216 or alternatively, can differ for each data transfer block 216. Each data transfer block 216 processes the input data (i.e., data from driver 208) into a form suitable for transfer to programmable logic resource core circuitry 110. Each data transfer block 216 outputs a data signal 220 through a respective channel 218 to programmable logic resource core circuitry 110.

Figure 3:
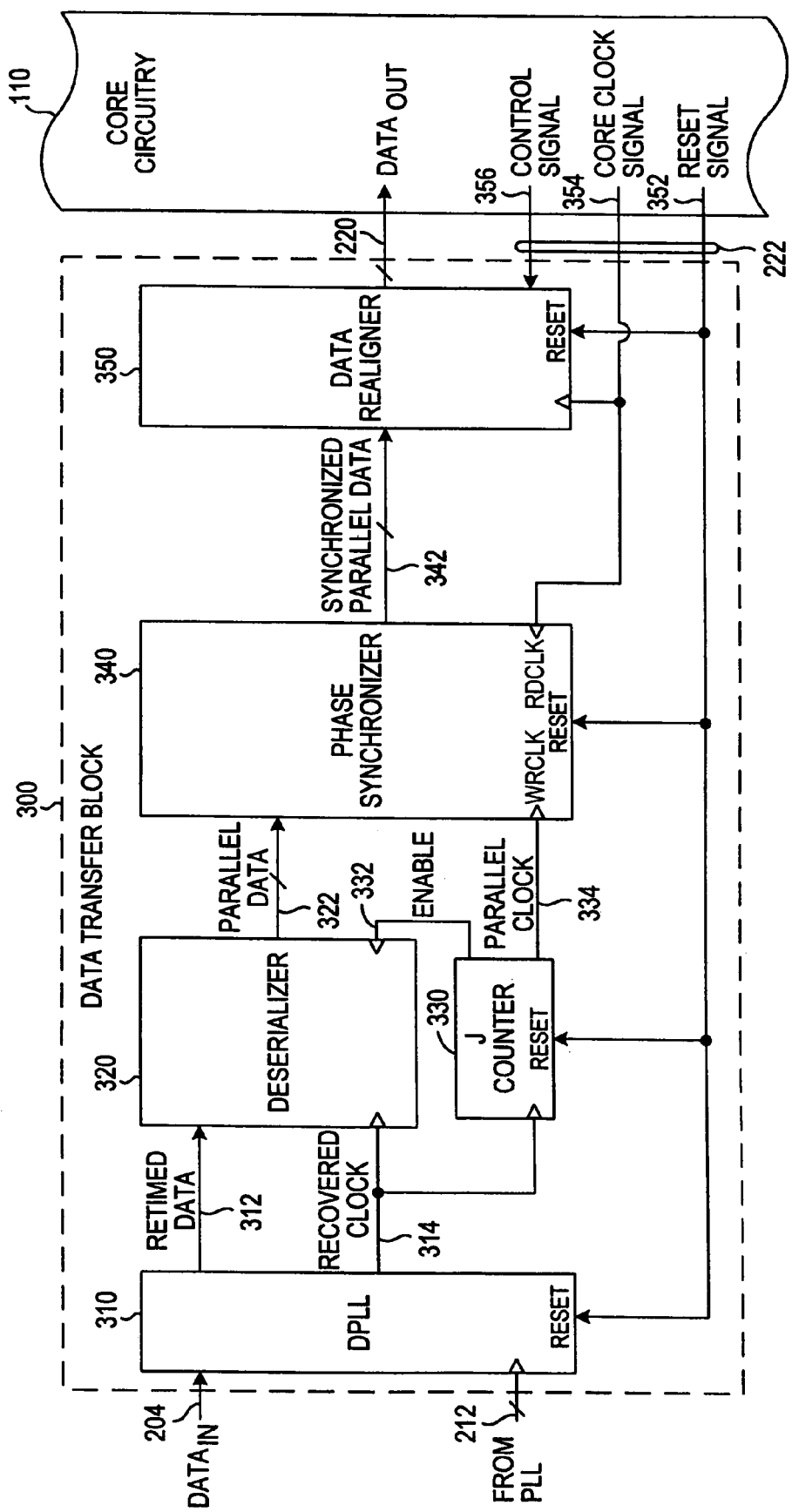
FIG. 3 is a more detailed, but still simplified block diagram of the data transfer block of FIG. 2.

FIG. 3 is a more detailed diagram of a data transfer block 300 (e.g., block 216) that uses a phase synchronizer. Block 300 receives clocks 212 from PLL circuit 210, data signal 204 from external circuitry via driver 208, and signals 222 from programmable logic resource core circuitry 110. Block 300 includes a dynamic phase alignment circuit (i.e., a digital PLL (DPLL) circuit 310, a deserializer 320, and a J counter 330), a phase synchronizer 340 and a data realigner 350. DPLL 310, J counter 330, phase synchronizer 340, and data realigner 350 can each receive a reset signal 352 (part of signals 222) that may be set during initialization of a programmable logic resource or at another suitable time. Reset signal 352 controls when registers are to be cleared.

DPLL 310, which receives data signal 204 and clocks 212, generates a recovered clock 314 based on clocks 212 and aligns data signal 204 to recovered clock 314 to produce retimed data 312. Retimed data 312 is sent to deserializer 320. Recovered clock 314, which has the same frequency as one of clocks 212 but can be offset in phase, is sent to deserializer 320 and J counter 330. Deserializer 320 converts the retimed data 312 to parallel data 322 having any suitable number of bits (e.g., 8 bits, 10 bits). J counter 330 (where J represents the number of bits in parallel data 322) controls the output of parallel data 322 from deserializer 320. For example, if deserializer 320 outputs eight bits of parallel data 322, J counter 330 (where J=8) maintains a counter that keeps track of the number of bits of retimed data 312 that are input to deserializer 320, sends an enable signal 332 to deserializer 320 indicating that deserializer 320 is to output the eight bits of parallel data 322, and resets the counter to keep track of a next set of eight bits of retimed data 312. J counter 330 also outputs a parallel clock 334 having the same frequency as core clock signal 354 (part of signals 222) but with a different phase.

Data is read into and written out of phase synchronizer 340 using different clocks. Parallel data 322 is written into a 4-bit deep first-in first-out (FIFO) buffer in phase synchronizer 340 based on parallel clock 334. Synchronized parallel data 342 is read out of the FIFO buffer from phase synchronizer 340 based on core clock signal 354. Synchronized parallel data 342 is input to data realigner 350, which can change the boundary of synchronized parallel data 342. Data realigner 350 outputs data 220 based on core clock signal 354 for input to programmable logic resource core circuitry 110. Data realigner 350 can also receive one or more control signals 356 (part of signals 222) that control whether to change the boundary of synchronized parallel data 342.

Figure 4A:
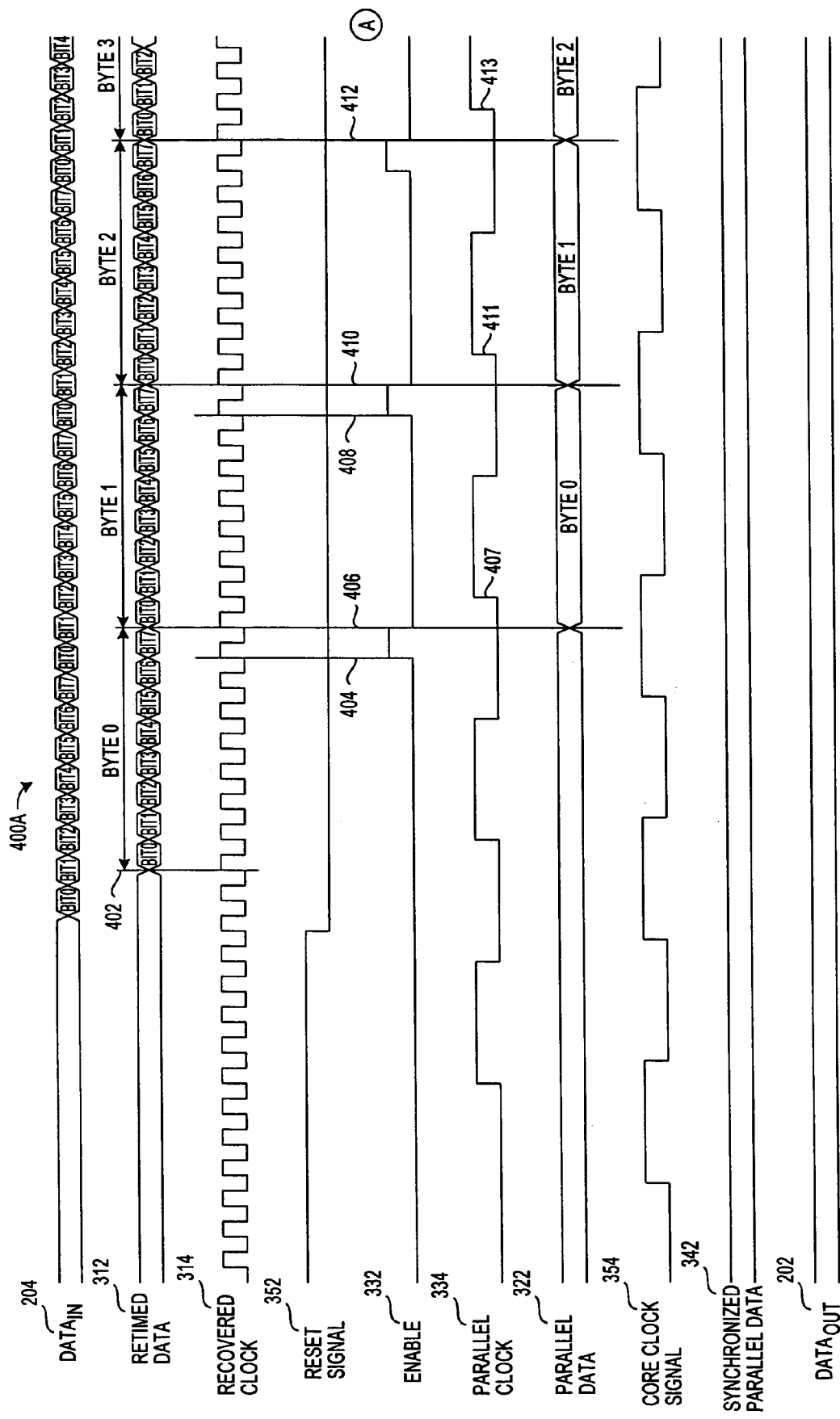
FIGS. 4A–B represent a timing diagram of the input and output signals in the data transfer block of FIG. 3.
Figure 4B:
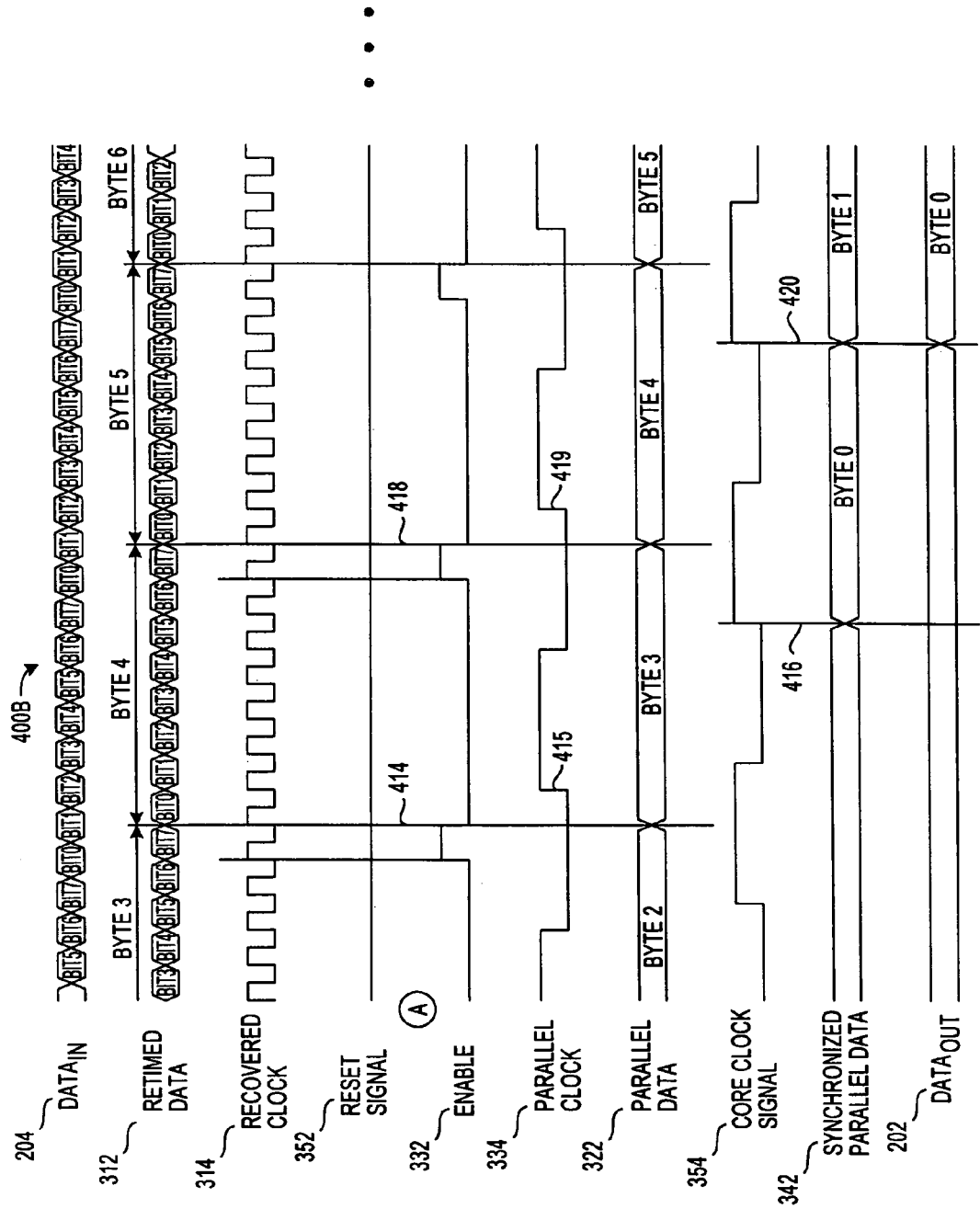

FIGS. 4A–B represent a timing diagram 400 of the input and output signals in data transfer block 300. Registers in block 300 can be initially reset by setting reset signal 352 to logic 1. Input data signal 204 can be a serial bit stream (e.g., Bit 0, Bit 1, . . . Bit 7, Bit 0, Bit 1, . . . ) that is sent as input to DPLL 310. DPLL 310 can output retimed data 312 that is phase aligned to recovered clock 314 (e.g., at reference 402). If deserializer 320 is to output eight parallel bits (other suitable number of bits can also be output), at the rising edge of the seventh clock cycle of recovered clock 314 (at reference 404), J counter 330 sets enable signal 332 to logic 1 so that at an eighth recovered clock cycle (at reference 406), deserializer 320 sends out a first byte of parallel data 322 (Byte 0) and the counter is reset. At the next rising edge of parallel clock 334 (at reference 407), the first byte of parallel data 322 is written into the FIFO buffer in phase synchronizer 340.

Seven recovered clock cycles later (at reference 408), J counter 330 sets enable signal 332 to logic 1 so that at an eighth recovered clock cycle (at reference 410), deserializer 320 sends out a second byte of parallel data 322 (Byte 1) and the counter is reset. At the next rising edge of parallel clock 334 (at reference 411), the second byte of parallel data 322 is written into the FIFO buffer in phase synchronizer 340.

Another eight recovered clock cycles later (at reference 412), deserializer 320 sends out a third byte of parallel data 322 (Byte 2) and the counter is reset. At the next rising edge of parallel clock 334 (at reference 413), the third byte of data is written into the FIFO buffer in phase synchronizer 340.

Yet another eight recovered clock cycles later (at reference 414), deserializer 320 sends out a fourth byte of parallel data 322 (Byte 3) and the counter is reset. At the next rising edge of parallel clock 334 (at reference 415), the fourth byte of data is written into the FIFO buffer in phase synchronizer 340. The 4-bit deep FIFO buffer is now full.

At a next rising edge of core clock signal 354 (at reference 416), which occurs before another byte of data is written into the FIFO buffer (at reference 419), phase synchronizer 340 reads out the first byte of synchronized parallel data 342 (Byte 0) to data realigner 350.

Another eight recovered clock cycles later (at reference 418), deserializer 320 sends out a fifth byte of parallel data 322 (Byte 4) and the counter is reset. At the next rising edge of parallel clock 334 (at reference 419), the fifth byte of data is written into the FIFO buffer in phase synchronizer 340.

At the next rising edge of core clock signal 354 (at reference 420), data realigner 350 outputs the first byte of output data 220 (Byte 0) and phase synchronizer 340 reads out the second byte of synchronized parallel data 342 (Byte 1) to data realigner 350. The use of phase synchronizer 340 introduces up to four clock cycles of latency.

In accordance with the invention, data can be synchronized between the dynamic phase alignment circuit and the programmable logic resource core circuitry without implementing a phase synchronizer. A programmable logic resource core clock and reset signal can be routed to a reset register for each channel. Each reset register controls the reset of the J counter for the deserializer. When the reset signal of the J counter transitions from logic 1 to logic 0, the counter begins to count and sets the enable signal accordingly. The programmable logic resource core clock is used to release the reset signal of the J counter in each channel. As a result, the enable signal generated by the J counter and the programmable logic resource core clock are phase associated. Also, because the DPLL generates a recovered clock (which can affect the enable signal) having a phase that can vary from one of the PLL clock phases by at most half a serial cycle, the minimum setup and hold times needed to correctly transfer the synchronized parallel data from the deserializer to the data realigner are met.

The programmable logic resource core clock also clocks the data realigner to output the data to the programmable logic resource core circuitry. This ensures synchronization between the dynamic phase alignment circuit and the programmable logic resource core circuitry without logic element replacement restrictions as long as setup and hold times are met for all interface registers under the same programmable logic resource core clock domain.

Figure 5:
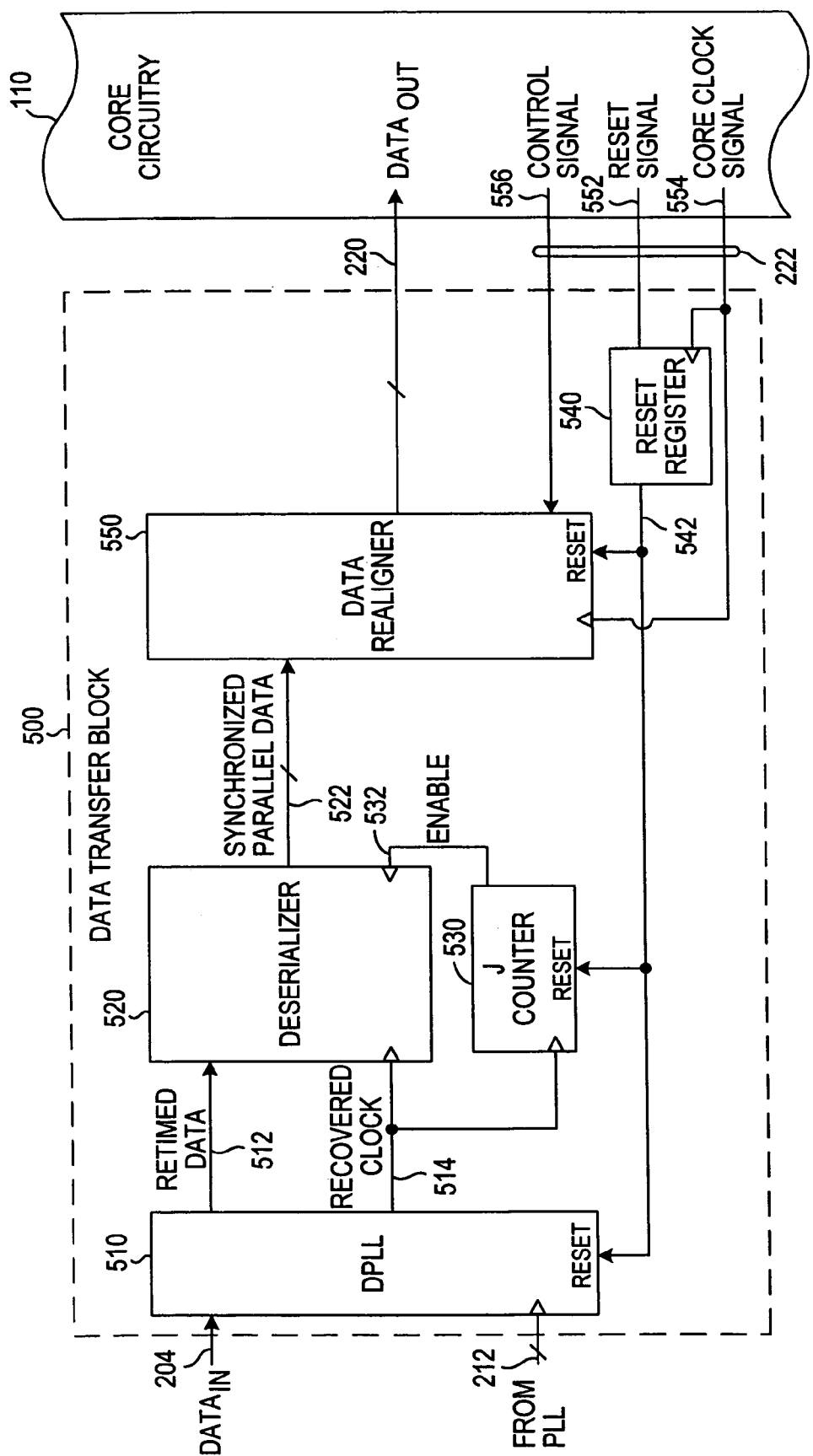
FIG. 5 is a more detailed, but still simplified block diagram of the data transfer block of FIG. 2 in accordance with the invention.

FIG. 5 is a more detailed diagram of a data transfer block 500 (e.g., block 216) that does not use a phase synchronizer in accordance with the invention. Block 500 receives clocks 212 from PLL circuit 210, data signal 204 from external circuitry via driver 208, and signals 222 from programmable logic resource core circuitry 110. Block 500 includes a DPLL circuit 510, a deserializer 520, a J counter 530, a reset register 540, and a data realigner 550. DPLL 510 generates a recovered clock 514 and aligns data signal 204 to recovered clock 514 to produce retimed data 512. Retimed data 512 is sent to deserializer 520. Recovered clock 514 is sent to deserializer 520 and J counter 530.

Reset register 540 is a flip-flop that receives as input reset signal 552 (part of signals 222) and outputs a reset signal 552 based on core clock signal 554 (part of signals 222). Reset signal 552, which is released from reset by core clock signal 554, is used to control the reset of DPLL 510, J counter 530, and data realigner 550.

Reset register 540 therefore determines when J counter 530 is to begin counting. Based on when J counter 530 is to begin counting, enable signal 532 is set accordingly. Enable signal 532 and core clock signal 554 are phase associated. When enable signal 532 is set, deserializer 520 outputs synchronized parallel data 522 to data realigner 550. Data realigner 550 outputs data 220 based on core clock signal 554 for input to programmable logic resource core circuitry 110. Data realigner 550 can also receive one or more control signals 556 (part of signals 222) that control whether to change the boundary of synchronized parallel data 522.

Core clock signal 554 can come from any suitable source that is based on the same clock source used to generate clocks 212. As a result, core clock signal 554 has a predetermined frequency relationship with clocks 212. In one embodiment, core clock 554 can be a clock generated from PLL circuit 210. For example, PLL circuit 210 can include a clock divider that divides one of clocks 212 by a predetermined factor. In another embodiment, core clock 554 can be generated from the same clock source by a separate clock divider circuit either external to the programmable logic resource or within programmable logic resource core circuitry 110.

Figure 6:
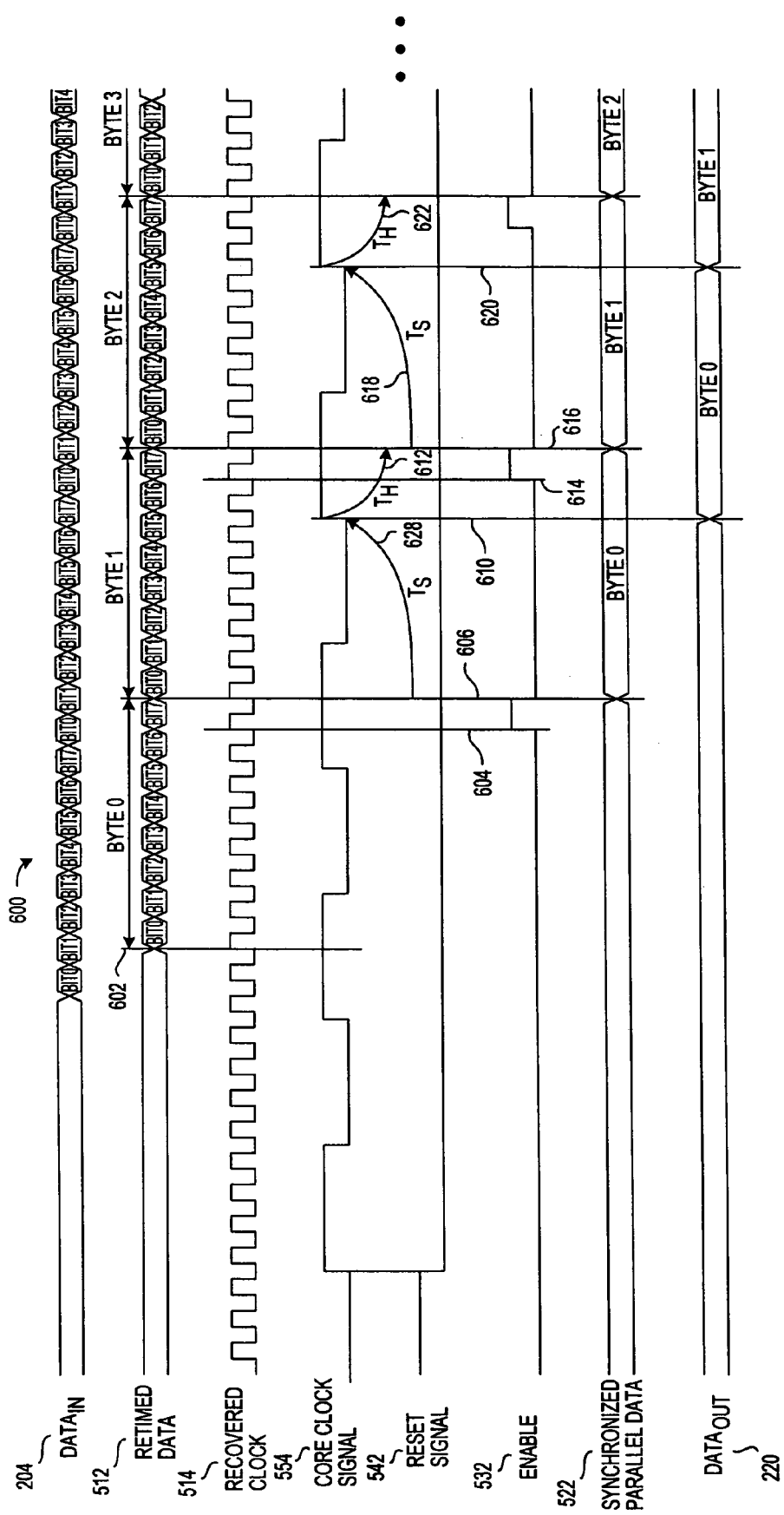
FIG. 6 is a timing diagram of the input and output signals in the data transfer block of FIG. 5 in accordance with the invention.

FIG. 6 represents a timing diagram 600 of the input and output signals in data transfer block 500. Registers in block 600 can be initially reset by setting reset signal 552 to logic 1. Reset signal 552 can be clocked in reset register 540 by programmable logic resource core clock 554 for output as reset signal 542. Input data signal 204 can be a serial bit stream (e.g., Bit 0, Bit 1, . . . Bit 7, Bit 0, Bit 1, . . . ) that is sent as input to DPLL 510. DPLL 510 can output retimed data 512 that is phase aligned to recovered clock 514 (at reference 602). If deserializer 520 is to output eight parallel bits (other suitable number of bits can also be output), at the rising edge of the seventh recovered clock cycle (at reference 604), J counter 530 sets enable signal 532 to logic 1 so that at an eighth recovered clock cycle (at reference 606), deserializer 520 sends out a first byte of synchronized parallel data 522 (Byte 0) and the counter is reset. (The usual definition of a byte is eight bits, but as used herein "byte" can refer to any plural number of bits such as eight bits, nine bits, ten bits, eleven bits, or fewer or more than these number of bits.)

At the next rising edge of core clock signal 554 (at reference 610), data realigner 550 outputs the first byte of output data 220 (Byte 0). As shown in references 608 and 610, synchronized parallel data 522 meets the respective setup (Ts) and hold (TH) times for correctly transferring the first byte of output data 220 to programmable logic resource core circuitry 110.

Seven recovered clock cycles later (at reference 614), J counter 530 sets enable signal 532 to logic 1 so that at an eighth recovered clock cycle (at reference 616), deserializer 520 sends out a second byte of synchronized parallel data 522 (Byte 1) and the counter is reset. At the next rising edge of core clock signal 554 (at reference 620), data realigner 550 outputs the second byte of output data 220 (Byte 1). As shown in references 618 and 622, synchronized parallel data 522 meets the respective setup (Ts) and hold (TH) times for correctly transferring the second byte of output data 220 to programmable logic resource core circuitry 110.

For clarity, the signals are described herein primarily in the context of being set and sent as input and output during the rising edges of various clock signals. However, the signals can be set and sent as input and output during the falling edges or both during the rising and falling edges of the various clock signals.

Implementing a reset register to synchronize the transfer of data in accordance with the invention has several advantages over using a phase synchronizer. The reset register eliminates the latency associated with storing data in the 4-bit deep FIFO buffer of the phase synchronizer. The invention therefore makes it easier for a user to design logic in, and can potentially save logic elements used in, the programmable logic resource core circuitry. In addition, less logic is needed to implement the reset register, which decreases the area and thus cost of the programmable logic resource.

Figure 7:
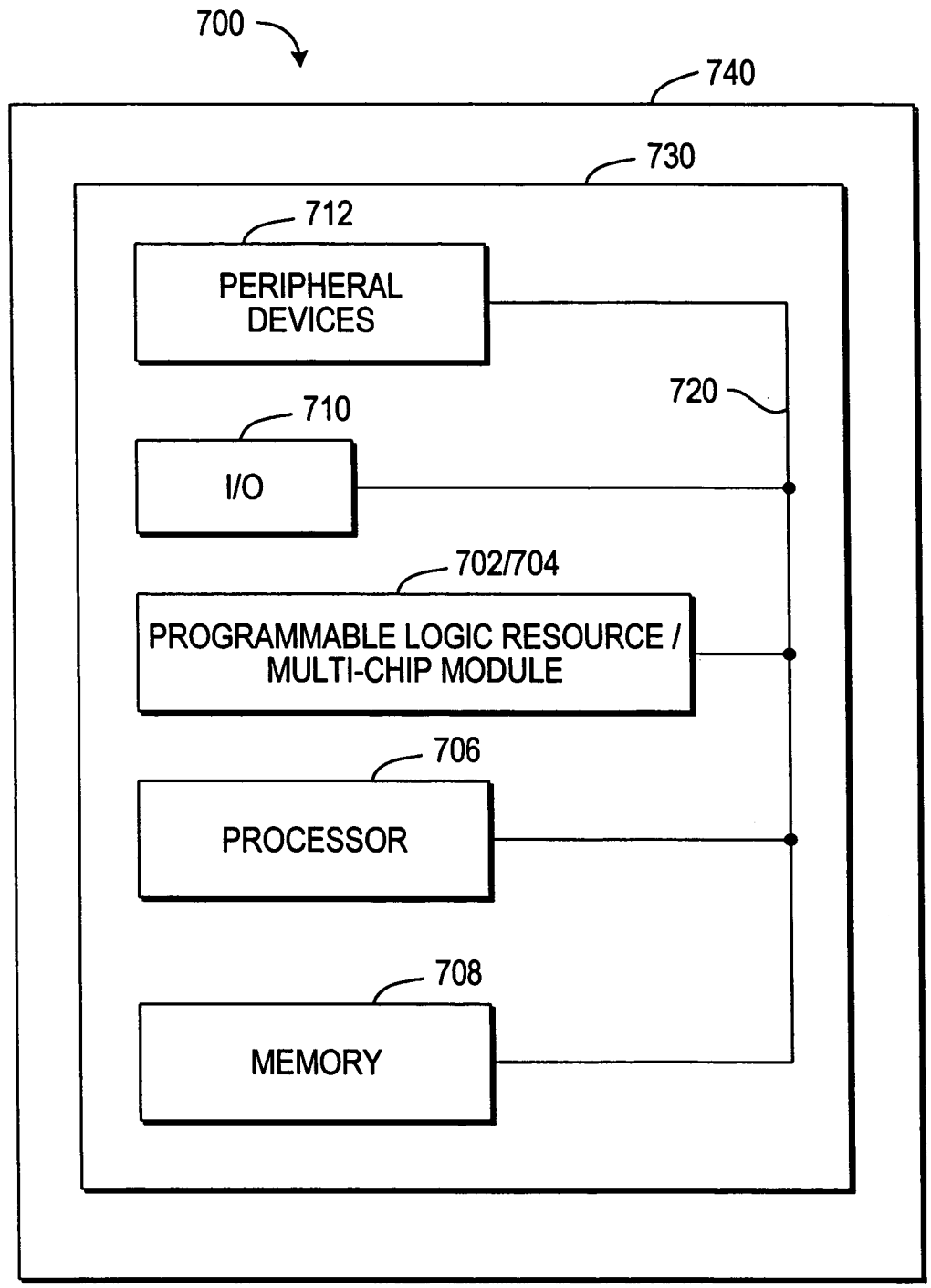
FIG. 7 is a simplified schematic block diagram of an illustrative system employing a programmable logic resource, multi-chip module, or other suitable device in accordance with the invention.

FIG. 7 illustrates a programmable logic resource 702, multi-chip module 704, or other device (e.g., ASSP, ASIC, full-custom chip, dedicated chip), which includes embodiments of this invention in a data processing system 700. Data processing system 700 can include one or more of the following components: a processor 706, memory 708, I/O circuitry 710, and peripheral devices 712. These components are coupled together by a system bus or other interconnections 720 and are populated on a circuit board 730 which is contained in an end-user system 740.

System 700 can be used in a wide variety of applications, such as computer networking, data networking, instrumentation, video processing, digital signal processing, or any other application where the advantage of using programmable or reprogrammable logic is desirable. Programmable logic resource/module 702/704 can be used to perform a variety of different logic functions. For example, programmable logic resource/module 702/704 can be configured as a processor or controller that works in cooperation with processor 706. Programmable logic resource/module 702/ 704 may also be used as an arbiter for arbitrating access to a shared resource in system 700. In yet another example, programmable logic resource/module 702/704 can be configured as an interface between processor 706 and one of the other components in system 700. It should be noted that system 700 is only exemplary, and that the true scope and spirit of the invention should be indicated by the following claims.

Various technologies can be used to implement programmable logic resources 702 or multi-chip modules 704 having the features of this invention, as well as the various components of those devices (e.g., programmable logic connectors ("PLCs") and programmable function control elements ("FCEs") that control the PLCS). For example, each PLC can be a relatively simple programmable connector such as a switch or a plurality of switches for connecting any one of several inputs to an output. Alternatively, each PLC can be a somewhat more complex element that is capable of performing logic (e.g., by logically combining several of its inputs) as well as making a connection. In the latter case, for example, each PLC can be a product term logic, implementing functions such as AND, NAND, OR, or NOR. Examples of components suitable for implementing PLCs include EPROMs, EEPROMs, pass transistors, transmission gates, antifuses, laser fuses, metal optional links, etc. PLCs and other circuit components may be controlled by various, programmable, function control elements ("FCEs"). For example, FCEs can be SRAMS, DRAMS, magnetic RAMS, ferro-electric RAMS, first-in first-out ("FIFO") memories, EPROMS, EEPROMs, function control registers, ferro-electric memories, fuses, antifuses, or the like. From the various examples mentioned above it will be seen that this invention is applicable to both one-time-only programmable and reprogrammable resources.

Thus it is seen that a more time-efficient and area-efficient approach in synchronizing the transfer of data into programmable logic resources without the use of phase synchronizers is provided. One skilled in the art will appreciate that the invention can be practiced by other than the prescribed embodiments, which are presented for purposes of illustration and not of limitation, and the invention is limited only by the claims which follow.

What is claimed is:

1. An apparatus for transferring data between two clock domains based on a same clock source and having a predetermined frequency relationship comprising:

a phase-locked loop circuit that receives a forwarded clock from a first clock domain and is operative to generate a plurality of clock phases;

a dynamic phase alignment circuit that receives a data signal from the first clock domain and the plurality of clock phases, and is operative to generate a recovered clock based on one of the plurality of clock phases, retime the data signal to the recovered clock, and deserialize the retimed data signal for output as parallel data;

a data realigner circuit that receives the parallel data and is operative to output the parallel data based on a core clock from a second clock domain; and a register that receives a reset signal and the core clock, and is operative to output the reset signal based on the core clock for input to the dynamic phase alignment circuit and the data realigner circuit.

2. The apparatus of claim 1 wherein the plurality of clock phases has a frequency that is a multiple of the frequency of the forwarded clock and is equally spaced apart in phase.

3. The apparatus of claim 1 wherein the phase-locked loop circuit is further operative to divide one of the plurality of clock phases by a predetermined factor for use as the core clock.

4. The apparatus of claim 1 wherein the dynamic phase alignment circuit comprises:
   a digital phase-locked loop circuit that receives the data signal, the plurality of clock phases, and the output of the register, and sends as output the retimed data signal and the recovered clock;
   a counter that receives the recovered clock and the output of the register, and is operative to set an enable signal as output after each of a predetermined number of cycles of the recovered clock; and
   a deserializer that receives the retimed data signal, the recovered clock, and the enable signal, and is operative to deserialize the retimed data signal for output as the parallel data based on the enable signal.

5. The apparatus of claim 4 wherein the counter begins counting when the output of the register is released from reset by the core clock.

6. The apparatus of claim 4 wherein the parallel data has a predetermined number of bits based on the counter.

7. The apparatus of claim 1 wherein the data realigner circuit is further operative to change a boundary of the parallel data based on at least one control signal.

8. The apparatus of claim 1 wherein the first clock domain is part of circuitry external to a programmable logic resource.

9. The apparatus of claim 1 wherein the second clock domain is part of programmable logic resource core circuitry.

10. A programmable logic resource comprising:
    programmable logic resource core circuitry; and
    interface circuitry that synchronizes data transfer from a first clock domain to the programmable logic resource core circuitry having a second clock domain, the interface circuitry having a register that receives a reset signal and a core clock from the programmable logic resource core circuitry, and is operative to output the reset signal based on the core clock to control reset of the interface circuitry, wherein the first clock domain and second clock domain are based on a same clock source and have a predetermined frequency relationship.

11. The programmable logic resource of claim 10 wherein the interface circuitry further comprises:
    a phase-locked loop circuit that receives a forwarded clock from the first clock domain and is operative to generate a plurality of clock phases;
    a dynamic phase alignment circuit that receives a data signal from the first clock domain, the plurality of clock phases, and the output of the register, and is operative to generate a recovered clock based on one of the plurality of clock phases, retime the data signal to the recovered clock, and deserialize the retimed data signal for output as parallel data; and
    a data realigner circuit that receives the parallel data and the output of the register, and is operative to output the parallel data based on the core clock to the programmable logic resource core circuitry.

12. The programmable logic resource of claim 11 wherein the phase-locked loop circuit is further operative to divide one of the plurality of clock phases by a predetermined factor for use as the core clock.

13. The programmable logic resource of claim 11 wherein the dynamic phase alignment circuit comprises:
    a digital phase-locked loop circuit that receives the data signal, the plurality of clock phases, and the output of the register, and sends as output the retimed data signal and the recovered clock;
    a counter the receives the recovered clock and the output of the register, and is operative to set an enable signal as output after each of a predetermined number of cycles of the recovered clock; and
    a deserializer that receives the retimed data signal, the recovered clock, and the enable signal, and is operative to deserialize the retimed data signal for output as the parallel data based on the enable signal.

14. The programmable logic resource of claim 13 wherein the counter begins counting when the output of the register is released from reset by the core clock.

15. The programmable logic resource of claim 11 wherein the data realigner circuit is further operative to change a boundary of the parallel data based on at least one control signal.

16. A digital processing system comprising:
    processing circuitry;
    a memory coupled to the processing circuitry; and
    the programmable logic resource as defined in claim 10 coupled to the processing circuitry and the memory.

17. A printed circuit board on which is mounted the programmable logic resource as defined in claim 10.

18. The printed circuit board defined in claim 17 further comprising:
    a memory mounted on the printed circuit board and coupled to the programmable logic resource.

19. The printed circuit board defined in claim 18 further comprising:
    processing circuitry mounted on the printed circuit board and coupled to the programmable logic resource.

20. A method for transferring data from a first clock domain to a second clock domain, wherein the second clock domain is based on a same clock source as, and has a predetermined frequency relationship to, the first clock domain comprising:
    applying a reset signal based on a core clock from the second clock domain;
    receiving as input a forwarded clock from the first clock domain and generating a plurality of clock phases;
    receiving as input a data signal from the first clock domain;
    generating a recovered clock based on one of the plurality of clock phases and retiming the data signal to the recovered clock;
    deserializing the retimed data signal to generate parallel data having a predetermined number of bits; and
    sending as output the parallel data based on the core clock.

21. The method of claim 20 further comprising dividing one of the plurality of clock phases by a predetermined factor for use as the core clock.

22. The method of claim 20 further comprising, upon release of the reset signal based on the core clock:
    initiating a counter to count a number of bits in the retimed data signal;
    enabling the output of the parallel data when the counter reaches the predetermined number; and
    resetting the counter.

23. The method of claim 20 further comprising changing a boundary of the parallel data prior to sending the parallel data as output.

* * * * *